June 5, 1945.  E. A. STALKER  2,377,386
AIRCRAFT
Filed Jan. 2, 1940  3 Sheets-Sheet 1
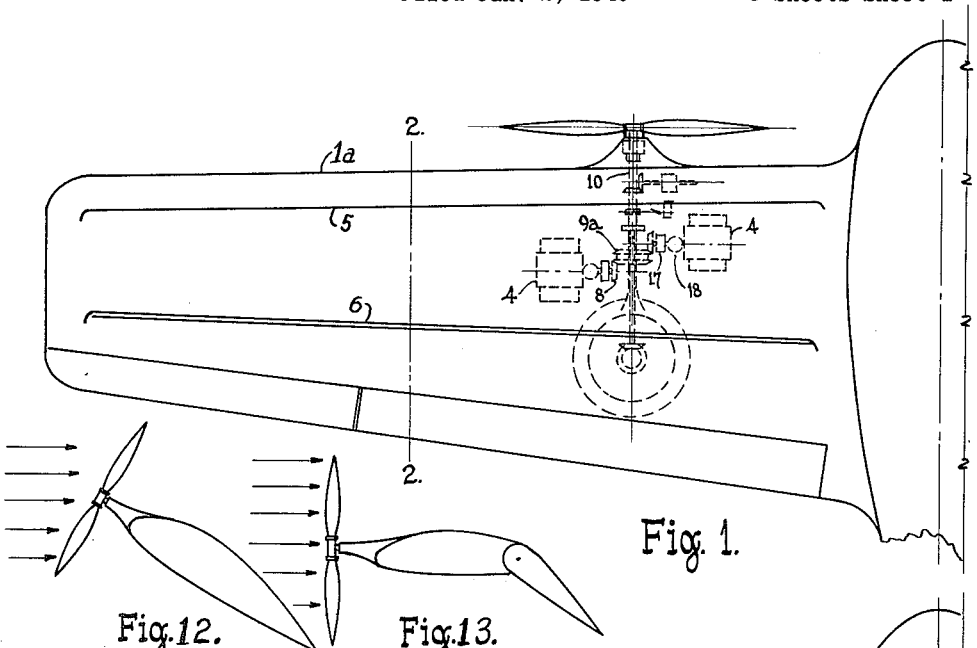
Fig. 1.
Fig. 12.   Fig. 13.
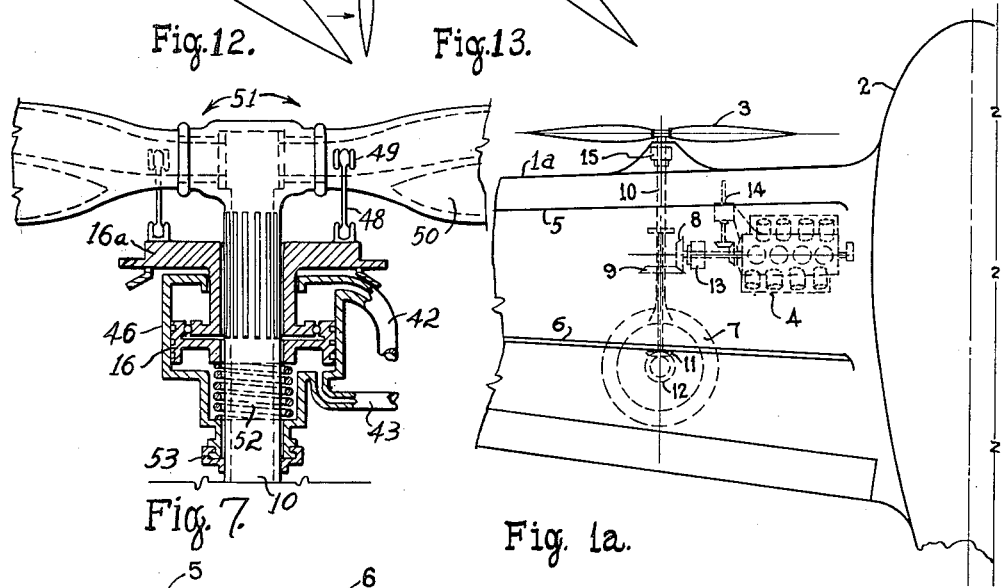
Fig. 7.   Fig. 1a.
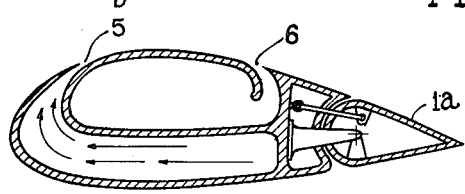
Fig. 2.
INVENTOR.
Edward A. Stalker

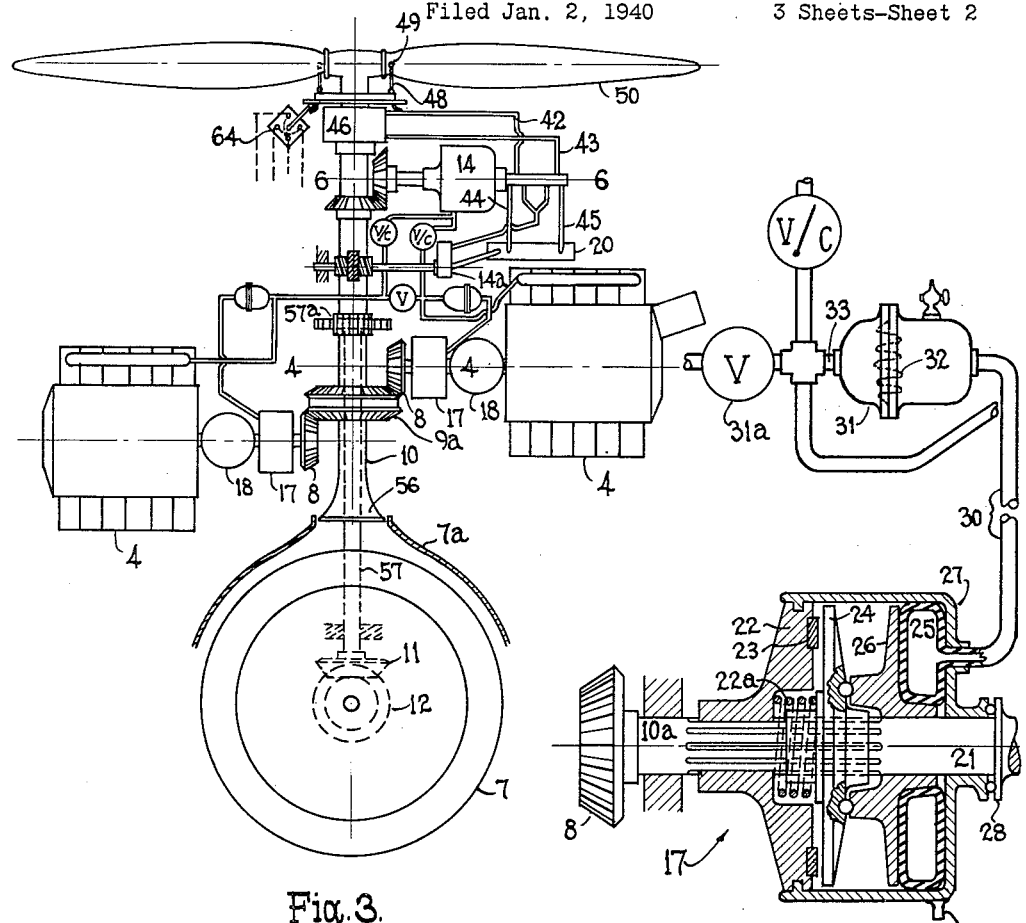
Fig. 3.
Fig. 4.
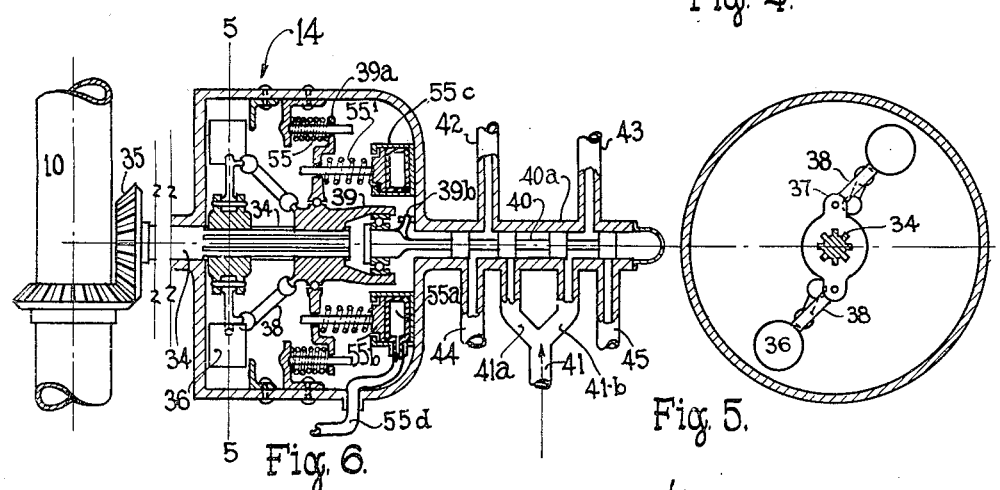
Fig. 6.
Fig. 5.
INVENTOR.
Edward A. Stalker

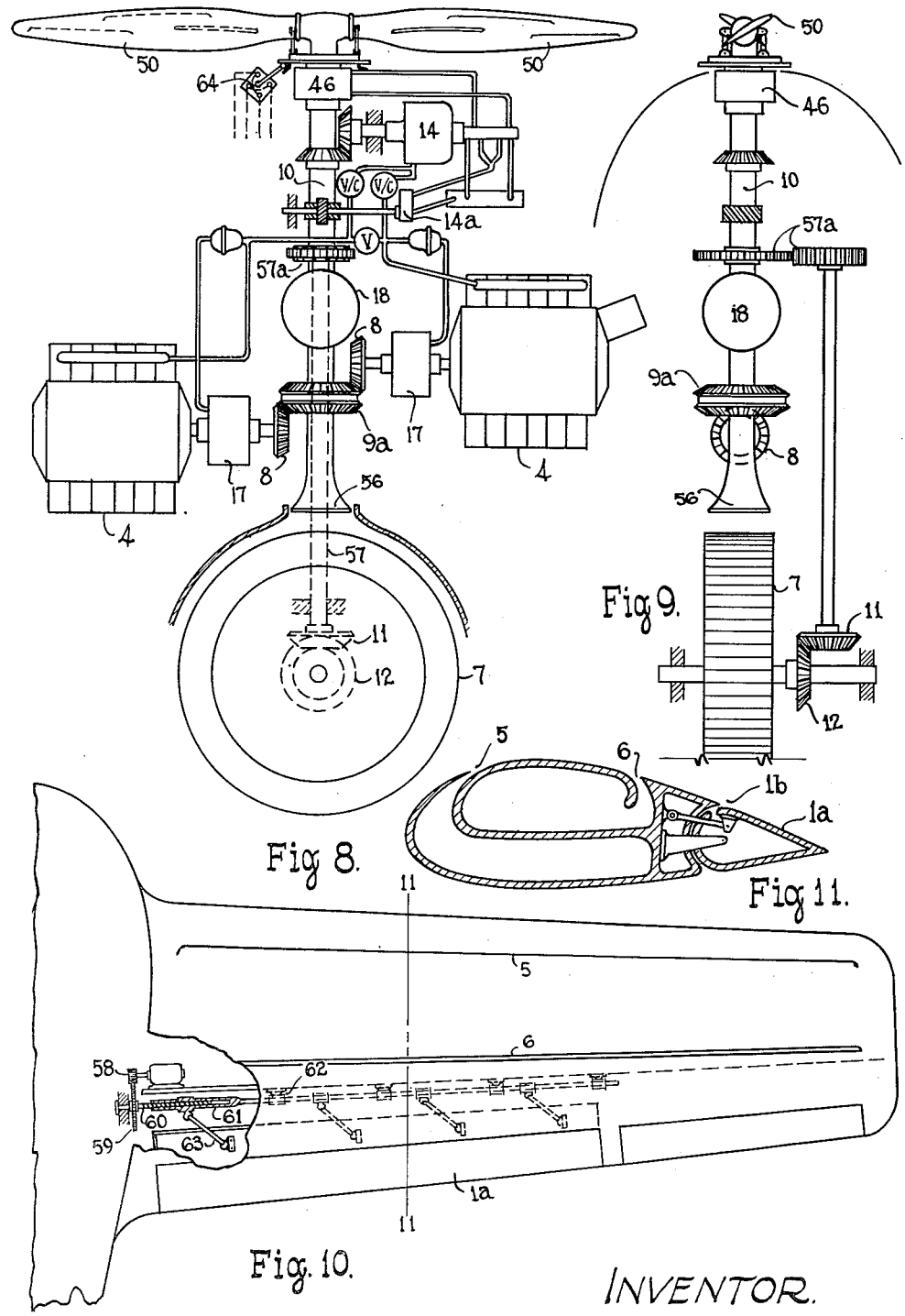

Patented June 5, 1945

2,377,386

UNITED STATES PATENT OFFICE 2,377,386

AIRCRAFT

Edward A. Stalker, Ann Arbor, Mich., assignor to The Dow Chemical Company, Midland, Mich., a corporation of Michigan Application January 2, 1940, Serial No. 312,173

9 Claims. (Cl. 244—42)

My invention relates to aircraft and has for its objects, first to provide means to adjust automatically the propeller blades to the best windmill attitude; second, to provide automatic means to operate a device in conjunction with the change of the propeller thrust capacity; third, to provide means to rotate the propeller by a plurality of engines operating through automatic clutches; fourth, to provide a propeller adapted to the large speed range made possible by the lift increasing device of the wing; fifth, to provide a propeller and wing combination highly efficient for the purpose of generating great lifting capacity. Other objects will appear from the description and drawing.

I attain the above objects by the means illustrated in the accompanying drawing in which—

Figure 1a is a fragmentary top plan view of an aircraft;

Figure 1 is a fragmentary top plan view of another aircraft;

Figure 2 is a section along the line 2—2 in Figure 1;

Figure 3 is an enlarged view of the engine, propeller, blower and some associated parts;

Figure 4 is a section through the automatic clutch taken along line 4—4 in Figure 3;

Figure 5 is a fragmentary section through the governor taken along line 5—5 in Figure 6;

Figure 6 is a fragmentary section taken along line 6—6 in Figure 3;

Figure 7 is a fragmentary side view of the propeller hub, the blade ends and associated pitch changing mechanism;

Figure 8 is the preferred form of the invention shown in fragmentary plan form;

Figure 9 is a fragmentary elevation of the mechanism in Figure 8;

Figure 10 is a fragmentary plan view of the aircraft;

Figure 11 is a section along line 11—11 in Figure 10;

Figures 12 and 13 refer to the theory.

I have discovered that if the wing has a split flat the airplane cannot land as slowly as one without such a flap, both employing the propeller to derive energy for increasing the lift through the use of a slot in the wing surface. The reason for this now becomes evident. It is due to the destruction of energy by the turbulence producing blunt end of the wing. This is accompanied by a high drag which slows down the forward speed of the machine without any recovery of energy to be applied to the blower for lift production. The propeller on the other hand slows down the forward speed but in doing so it recovers a large amount of energy to be applied to the lift increasing device. The lift reduces the vertical component of the velocity as well as the forward speed.

Yet it is desirable to have some means of changing the angle of attack of the wings without changing the attitude of the propeller shaft. If the front of the shaft is rotated upward the propeller acts in a side wind and does not recover as great an amount of energy from the air as for the direct head-on position. Figures 12 and 13 illustrate the two cases.

I therefore equip the wing with a flap which is different from that which has come into general use. That is, I do not use the prevalent split flap but a complete flap as shown in Figures 2 and 11. These are of course used on a swing having a means of controlling the boundary layer.

It is a feature of this invention then that the wing cooperates with the propeller so that acting as a windmill it can recover the fullest amount of energy from the air.

To develop this cooperation further I provide a propeller having adjustable blades arranged differently than those in practice where the blades assume a large pitch automatically if the engine ceases to function properly. In my invention the blades automatically assume a pitch of small value suited for high efficiency when the propeller acts as a windmill.

I also interconnect the flap and propeller so that the change of propeller pitch to the windmilling state is accompanied by the movement of the flap to the high lift position.

Also I provide a novel means of connecting the propeller to the engine so that when the engine ceases to function it is disconnected from the propeller. Yet I do not use an over-running clutch for this purpose because the propeller is not then able to act as a flywheel since it cannot exert a forward torque on the engine shaft. Rather I use a clutch operated automatically in accordance with the pressure in one or more engine cylinders. When the gas pressure of the explosion exists the clutch is automatically engaged. This is the preferred clutch form.

In another form of the invention I provide a torque converter or a variable speed transmission with a clutch, preferably an automatic one. With this arrangement not only are the blades adjustable as to pitch but the rate of rotation of the propeller varies relative to the engine shaft. The engine and propeller are then able to produce thrust more efficiently at all speeds of flight and the combination is particularly effective with a wing capable of generating a great lifting capacity.

Referring now particularly to the drawing of one form of the invention shown in Figure 1a the wing is 1 and the fuselage is 2. The propeller is 3 and the engine is 4. The wing has in its surface the slots 5 and 6 served by the blower 7 which inducts air at the induction slot 6 and discharges it at the discharge slot 5.

The wing is equipped with the rotatable flap 1a.

The engine drives the propeller through the gears 8 and 9, the latter fixed to the propeller shaft 10. This shaft extends rearward to drive the blower through the gears 11 and 12.

I have shown in my Patent No. 1,913,644 granted June 13, 1933, how it is possible to adapt an in-line engine to the driving of the blower, using the propeller as a windmill and providing means to free the propeller of the drag of a dead engine.

With a radial engine of the twin-row staggered type it is not feasible to extend rearward an auxiliary shaft without placing it outside the periphery of the engine which would be an awkward arrangement.

I have devised the arrangement of Figure 1a to obviate this difficulty.

Between gear 8 and the engine I place the over-running clutch 13 and between it and the engine I place the governor 14. The power of the engine then flows through the over-running clutch 13 to the gears 8 and 9 and hence to the propeller.

It will be clear now that the propeller could drive the blower but not the engine. Thus an arrangement is provided whereby a radial engine can be used in a propeller-blower-engine combination with the propeller free to drive the blower.

The pitch of the propeller blades is to be changed automatically to the windmill state by means of the cylinder 15 containing a piston which is connected to the blades for turning them by suitable arms to be described subsequently.

If current engines are employed the governor is situated on the engine as indicated in Figure 1a and so on the engine side of the clutch 13. The governor controls the pitch of the propeller through controlling the fluid flow to the cylinder 15. Then the governor can control the supply of fluid to the cylinder 15 in accordance with the engine speed—but not the propeller speed for the case where the propeller tends to relieve the engine of a load. If the propeller over-runs the engine there is no restraint on the engine speed because its load should come from the propeller.

Hence it is clear that the safety of the engine is jeopardized and the propeller pitch is not completely controlled to provide the best rate of rotation for the forward speed.

In Figures 1 and 3 the method of getting a blower shaft past the engine is retained and means are provided for governing the propeller rate and the engine rate of rotation while providing for the unencumbered drive of the blower by the propeller acting as a windmill.

The engines are connected to the propeller shaft 10 through an automatic clutch 17 as well as a torque converter 18. The governor 14 and the associated oil pump 14a to supply it are both driven from shaft 10.

The consequences of this arrangement are that the engine remains in a defined relation to the propeller and the governor is able at all times to control the speed of rotation of both the propeller and the engine when it is operating.

The automatic clutch 17 is shown in cross section in Figure 4. The engine drive shaft is 21 and the shaft of gear 8 is 10a. The latter has fixed to it the clutch plate 22 with suitable friction material 23 embedded in it. A driving clutch plate 24 is slideably splined to the drive shaft and it can be forced against the driven plate by fluid pressure exerted in the vessel 25 formed of such flexible material as rubber. The extension of the vessel forces the idler plate 26 against plate 24. Between these two plates are balls to eliminate friction tending to rotate parts 26 and 25. The reaction of the fluid pressure is taken by the shell 27 which bears through a ball bearing on the collar 28 integral with the shaft 21. A lug 29 is to be held by a suitable structure to prevent the turning of the shell 27. A spring 22a keeps the clutch plates from rubbing when not engaged.

Pressure is served to the interior of the flexible vessel by the tube 30 from the two-compartment bomb 31. It is divided by the flexible diaphragm 32 and on the clutch side is filled with liquid. On the engine side it is filled with gas from the engine cylinders. It may however be filled with oil particularly if a U seal is placed in the supply line 33. The remainder of the tube would then be filled by gas from several or all of the engine cylinders.

While the engine is operating the explosive pressure of the gas in any of the cylinders is sufficient to engage the clutch but when the gas in the cylinders fails to explode the clutch disengages the engine from the propeller shaft.

The bombs 31 are interconnected by the manual valve 31a so that when one engine is started pressure is directed to the clutch of the next one so that the active engine may turn the next one over and start it.

The governor 14 is shown in Figures 5 and 6 and is comprised of a shaft 34 driven by the bevel gear 35 in mesh with a gear on shaft 10. Mounted on and turning with the governor shaft are two weights 36 whose arms are hinged at their inner ends to the double lugs 37 fixed to the governor shaft 34. A connecting rod 38 extends from each weight to a valve sleeve 39 freely slideable axially on the governor shaft. These connecting rods are universally connected at their ends to permit the weights to move radially and move the valve sleeve 39 axially. This valve sleeve moves the valve rod 40 in cylinder 40a and is turned to a small diameter at intervals to form free spaces around which fluid can flow.

Fluid is conducted to the valve cylinder through the tube 41 having branches 41a and 41b. A movement of the valve rod permits fluid to enter one of the tubes 42 or 43 leading to the pitch adjusting cylinder 46. In the same instance fluid is permitted to return to the fluid sump 20 through the appropriate tube 44 or 45.

The pump 14a is driven from the propeller shaft 10 and takes its fluid supply from the sump 20.

The tubes 42 and 43 conduct fluid to the adjusting cylinder 46 which has within the piston 16. One end of the piston protrudes from the cylinder and has jointed to it the arms 48 which are articulated to levers 49 fixed to the propeller blades. See Figures 3 and 7.

In Figure 3 a movement of the valve rod 40 in the governor sends fluid to one side of the piston moving it and thereby changing the pitch of the propeller blades 50 since they are free to rotate in the hub of the propeller 51. An outward movement of the piston reduces the pitch. A spring 52 within the cylinder turns the blades to a low pitch or the windmill state in case the fluid pressure is absent. Hence the blades always assume the position to act as a windmill for increasing the lift—in case of power failure for instance.

The cylinder 46 is positioned axially on the shaft by a suitable collar 53 and bearings 54 at the rear end of the cylinder. The shaft 10 is free to turn within the piston 16 and both are suitably grooved to provide for sealing. The protruding portion 16a of the piston 16 is splined to shaft 10 and carried by bearing balls on piston 16.

Returning to Figure 6 there are springs 55 and 55' in the governor bearing on each side of the arms 39a of sleeve 39. At one side the spring 55' bears against the piston 55b sliding in cylinder 55c and pressing against the rubber vessel 55a. A tube 55d connects the vessel to the tube 33 so when the engine is running the gas pressure compresses the spring 55 and aids the centrifugal force of the weights 36 in adjusting the pitch to a larger value in case the speed of the engine tends to increase. In Figure 6 the vessel 55a is shown under pressure from the engine.

When the engine stops the pressure in vessel 55a disappears and the valve rod 40 is displaced to the right and so a greater outward travel of the weights 36 must be made before the valve uncovers the tube 41b to send fluid to increase the pitch. Also the centrifugal force of the weights must unaided overcome the action of spring 55 and so the rate of rotation of the propeller is established at a higher level or by suitable adjustment of the parts at any level.

A bypass valve 55e in line 55d is operable manually from the cabin and is usable to adjust the angular velocity and pitch relationship when desired.

The valve rod 40 is borne in the ball bearing housed by the sleeve 39 and is prevented from turning by the lug 39b engaging a projection on the governor housing.

It is now clear that any number of engines can be connected to the propeller drive shaft and the engines can have the advantage of the propeller as a flywheel and yet each engine can be disengaged automatically. Furthermore the speed of rotation of the propeller can be governed independently of any engine's operation.

If the engine while operating is positively connected to the propeller shaft its speed is governed by the governor. It is still governed within a certain range if the engine is connected to the clutch and propeller by a torque converter which I prefer to insert in the path of power flow. In Figure 3 the converter is 18 as noted earlier.

The torque converter is the type disclosed in my U. S. Patent No. 2,223,743. This device has the property of transmitting power from either shaft to the other so that the governor can control the engine speed within a range of speeds fixed by the characteristics of the torque converter. I use the term "torque converter" to refer to a device which can magnify the torque received and can change either the torque or the ratio of rates of rotation of the driven and driving shafts automatically by infinitestimal amounts. In other words, the speed ratio can have an infinite number of values.

A torque converter of the type described has the property of dividing the available power into the torque required by the load and such an angular velocity that the product of torque and angular velocity equals the power supplied.

When inserted between the propeller and engine a torque converter will serve a number of purposes.

As the airplane climbs the engine power output for any rate of rotation diminishes because of the lowered density which results in a lowered pressure on the pistons. This loss of power could be compensated by letting the engine rotate faster and therefore receive more pressure impulses on the piston. If the engine bears a fixed relationship to the propeller this is not possible if the propeller is to retain the most effective pitch. A torque converter however will let the engine rotate at its best speed while the propeller is rotating at its best speed.

Furthermore when an airplane has a large speed range (the ratio of maximum speed to landing speed) it is not best to rely on rotating the propeller blades bodily in the hub to change the pitch and thereby the rate of rotation of the engine because the pitch angle should not be changed by the same amount at all stations along the radius. The better procedure is to change the pitch within certain limits and then adjust the angular velocity of the propeller relative to the engine by a torque converter. This is particularly desirable when the pitch angle exceeds 45 degrees, for then the propeller begins to lose in efficiency and for high airplane speeds it is desirable to increase the rate of rotation rather than increase the pitch. The torque converter does this naturally by its inherent property of always adjusting the speed to the load. If the pitch for instance is given a certain range of angles when the limit of this range is reached the torque converter will then assume the role of adapting the propeller rate of rotation to that most suitable.

The propeller shaft 10 of Figure 3 is hollow and of variable diameter providing the flare 56 at the end. The shaft 57 as shown in Figure 3 is below the propeller shaft 10 and is driven by it through the gear train 57a. The blower 7 is driven through the gears 11 and 12 as mentioned previously and besides serving the wing slots, it also supplied air to the interior of the propeller through the duct 7a which at its end envelopes the flared portion of shaft 10.

In the preferred form of the invention as shown in Figures 8 to 11 only one torque converter 18 is used and it is placed between the propeller and the engines. The automatic clutches remain in the locations between the engines and their gears 8. Furthermore the shaft 57 to the blower is driven from the portion of the propeller shaft between the torque converter and the propeller by gear train 57a.

The pitch changing device and the governor are located and operated as described previously.

The preferred arrangement has the advantage of simplicity, less cost and better cooperation between the pitch changing mechanism and the control of the revolution rate by the torque converter.

The torque converter and pitch changing device supplement each other. As long as there is enough range of pitch angles to control the propeller shaft angular rate, the governor controls it. But beyond this the torque converter alters the speed of the propeller relative to the engine. This combination is particularly efficient for airplanes having a high speed range, as for instance airplanes equipped with a device for creating great lifting capacity for landing.

The combination of torque converter and pitch control of the angular velocities is also important in a propeller to be adapted to a windmill when this propeller must serve an airplane for a great speed range. The distribution of pitch along the radius for such a propeller is radically different from the best distribution for a windmill. Therefore it is desirable to employ a compromise distribution of pitch and to ameliorate the disadvantage to the propeller by providing for a variable rotation rate with respect to the engine's speed of rotation.

The blower 7 controls the boundary layer through the slots 5 and 6 and so increases the lifting capacity to great values. The relation of the slots and blower are shown in my U. S. Patent No. 2,041,795. The wing also has the lift augmenting device, the flap 1a. It is preferably not of the split type now in use but one tapering to a thin edge so that it does not produce turbulence which would slow down the forward motion of the aircraft and rob the propeller of some of its energy to be derived from the relative wind. The flap has the slot 1b to reduce turbulence formation.

The flap 1a is related to the pitch changing device so that it is rotated downward when the blade pitch is changed to the windmill value.

As shown in Figure 10 the flap is rotated by an electric motor turning the gears 58 and 59 of which the latter is fixed to a shaft 60 having threaded ends which engage the internal threads of the rod 61 which is slideable spanwise in suitable guides 62. To the rod are hinged connecting rods 63 which are universally connected at their other end to the flap. A rotation of the gear 59 displaces the rod 61 spanwise and rotates the flap 1a.

The motor is set in motion by the reversing switch 64, Figures 3 and 8, operated by the fore and aft motion of the piston 16 in cylinder 46. A forward motion rotates the flap downward. A manually operated switch is provided in the cabin to operate the flap when desired.

It is now clear that I have shown how to construct a wing-propeller combination adapted to create very high lifting capacity through the cooperation of the propeller and the wing. I have shown that a wing flap increases the power available from the propeller acting as a windmill because it permits the propeller shaft to be directed more nearly into the wind. In addition I have shown that this flap should provide a tapered end of the wing so as not to destroy energy which would otherwise be available to the propeller. If the flap creates turbulence and therefore drag the wind relative to the propeller is reduced.

Moreover I have shown how the flap can be operated automatically with the pitch changing device to convert the propeller to a windmill. This is a very important safety feature for landing.

I have shown how a radial engine can be adapted to the propeller-blower combination.

I have also disclosed means to drive the propeller under governed conditions and still make it available to drive the blower free of the encumbrance of dead engines.

Furthermore I have shown how a variable speed device and the pitch changing device can cooperate to provide higher propeller and windmill efficiencies and how they and blade slots can mitigate some of the disadvantages of changing the pitch of the blades uniformly along the radius. These disadvantages are larger the greater the speed range of the airplane which is determined chiefly by the lifting capacity of the wings.

It will now be obvious that my invention provides a solution to problems of great difficulty and furnishes an aircraft of great utility and safety. Cross reference is made to copending application Serial No. 401,171, filed July 5, 1941, which contains subject matter divided out of the present application.

While I have illustrated certain specific forms of the invention it is to be understood that I do not limit myself to these exact forms but intend to claim my invention broadly as defined by the claims.

I claim:

1. In combination in an airplane an engine, an adjustable pitch propeller operably connected to said engine, a wing having a movable flap, and means cooperating between said flap and propeller so that an adjustment of the pitch beyond a preassigned value initiates a movement of said flap.

2. In an aircraft in combination an adjustable pitch propeller, an engine operably connected to the propeller to rotate the same, a wing having a lift increasing device requiring power for operation thereof, transmission means connecting said propeller to said device to transmit power thereto from the propeller acting as a windmill, a governor operably connected to the engine and said propeller to govern the pitch in accordance with the speed of rotation of the engine within predetermined limits, and means responsive to reduction of the engine power below a predetermined limit for modifying the action of said governor to effect a decrease in the pitch setting of said propeller to increase the speed of rotation thereof and of said lift increasing device.

3. In an aircraft, a wing having a movable flap, power means to move the flap relative to the aircraft a propeller having a blade adjustable as to pitch, power means having a movable part to adjust the pitch attitude of the said blade, and an element operably connecting said flap power means to said part, the movement of said part initiating the operation of said flap power means.

4. In combination in an aircraft a wing having a flap, means to move said flap from a raised high-speed position to a lowered high-lift position, an engine developing a fluid pressure therein in operation, an adjustable pitch propeller operably connected to the engine to propel the aircraft, a governor operably connected to said engine and said propeller to govern the propeller pitch between predetermined limits in accordance with the speed of rotation of the propeller, and pressure responsive means connected to said engine and governor to alter the said limits and to cause the lowering of said flap in response to a fall in the operating pressure of the engine below a predetermined limit.

5. In combination in an airplane, an engine, an adjustable pitch propeller operably connected to said engine, a wing having a movable flap adjustable from a raised high-speed position to a lowered high-lift position, and means cooperating between said flap and said propeller and responsive to adjustment of the pitch of said propeller below a predetermined limit for effecting movement of said flap to its said lowered position.

6. In combination in an aircraft, a wing, a lift augmenting device associated with said wing and adapted to be selectively placed in operation, an engine and adjustable pitch propeller connected with said engine, means for adjusting the pitch of said propeller, means responsive to the power output of said engine, and means controlled by said responsive means and operable upon reduction of the power output of said engine below a predetermined value for concurrently actuating said pitch adjusting means to reduce the pitch of said propeller and for initiating the operation of said lift augmenting device.

7. In an aircraft, a propeller, an engine, a flap, a blower, means for connecting said propeller and said blower providing for driving of the latter during windmilling of said propeller, a clutch for detachably interconnecting said engine and said propeller providing for transfer of power in either direction therebetween while said clutch is engaged, means responsive to reduction of the engine power below a predetermined limit for effecting disengagement of said clutch leaving said propeller free to drive said blower by windmilling, and means also responsive to said reduction of engine power for effecting the lowering of said flap.

8. In an aircraft in combination an adjustable pitch propeller, an engine operably connected to the propeller to rotate it, a wing having a lift increasing device requiring power to operate it, transmission means connecting said propeller to said device to transmit power thereto from the propeller acting as a windmill, means for adjusting the pitch of said propeller, and means responsive to reduction of the engine power below a predetermined limit for actuating said pitch adjusting means to effect a decrease in the pitch setting of said propeller to increase the speed of rotation thereof and of said lift increasing device.

9. In combination in an aircraft a wing having a flap, means to move said flap from a raised high-speed position to a lowered high-lift position, an engine developing a fluid pressure therein in operation, an adjustable pitch propeller operably connected to the engine to propel the aircraft, means for adjusting the pitch of said propeller, and pressure responsive means connected to said engine and to said pitch adjusting means to cause a change in the pitch setting of the propeller and the lowering of said flap in response to a fall in the operating pressure of the engine below a predetermined limit.

EDWARD A. STALKER.